Patented June 21, 1932

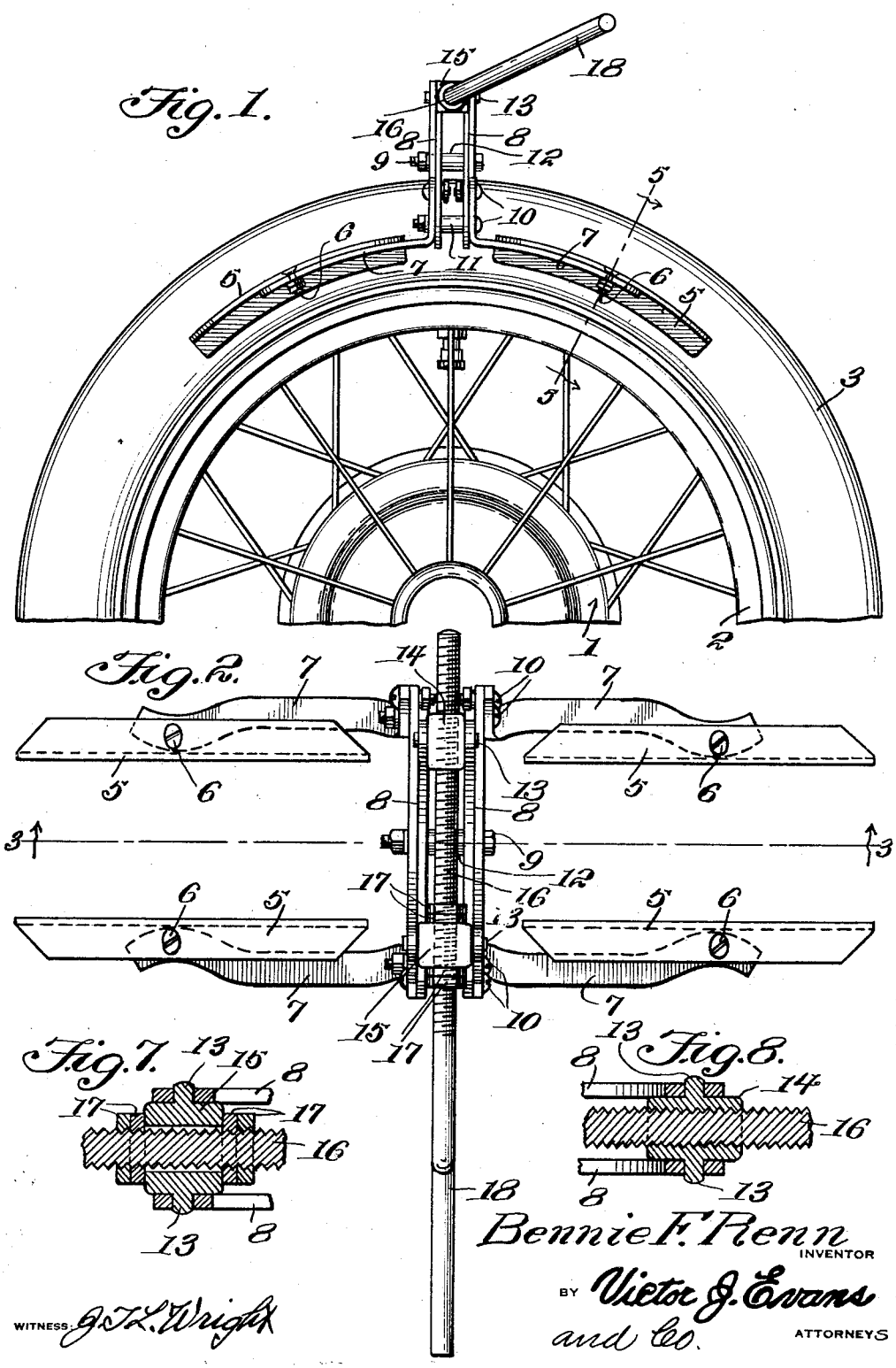

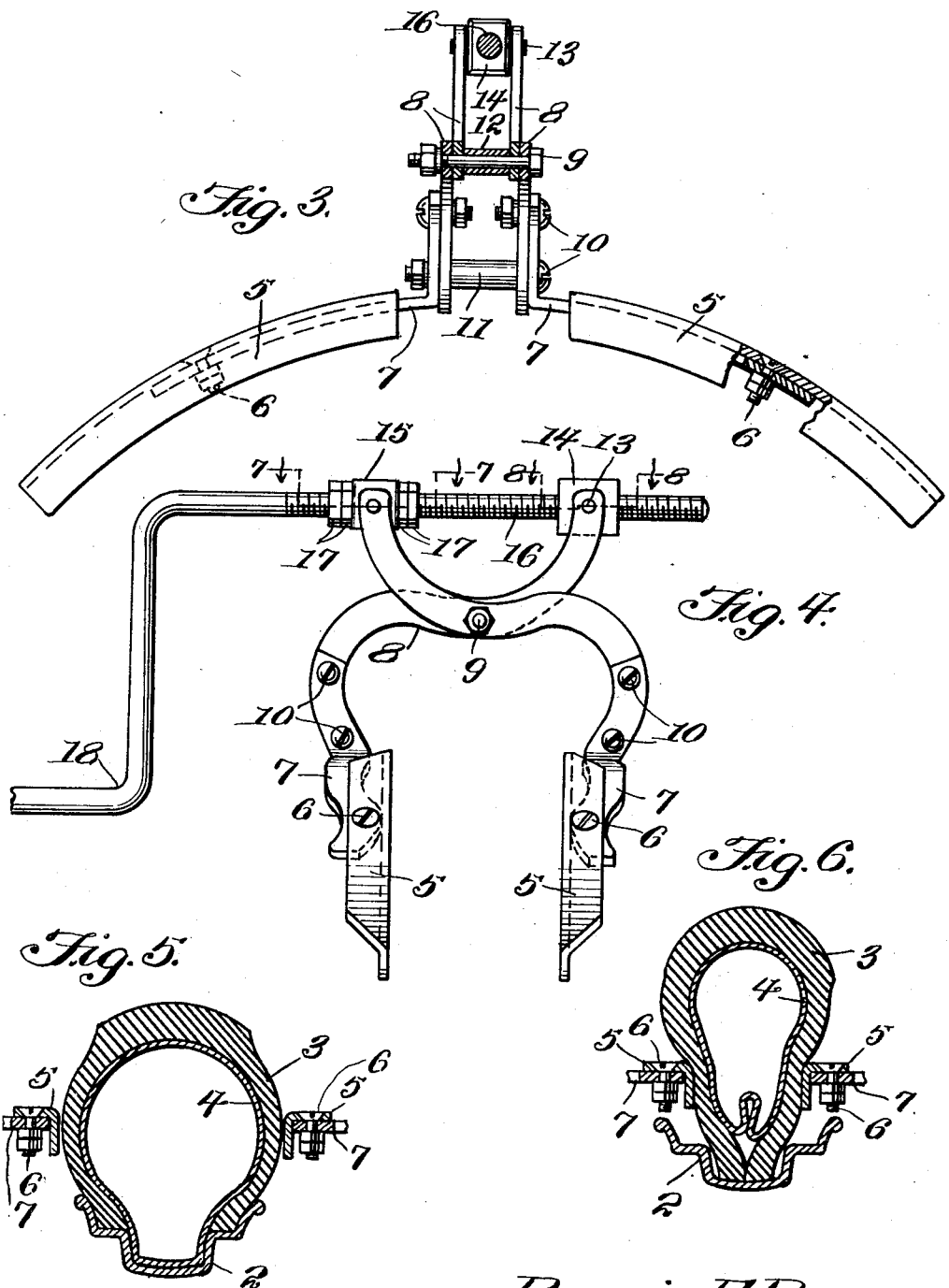

1,863,876

UNITED STATES PATENT OFFICE

BENNIE F. RENN, OF JEFFERSON CITY, MISSOURI

RIM TIRE TOOL

Application filed April 10, 1931. Serial No. 529,247.

My present invention has reference to a tool for facilitating the application to or removal of pneumatic tires and tubes from drop center, and the primary object is the provision of a tool for this purpose that may be easily operated to compress portions of the opposite sides of the tire, compressing the tube and the beads of the tire together so that the beads of the tire can fall into the center of the rim to permit of the ready application or removal of the tire.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a side elevation of the improvement in applied position.

Figure 2 is a top plan view of the improvement per se.

Figure 3 is a side elevation thereof with parts in section.

Figure 4 is an end view.

Figure 5 is a sectional view approximately on the line 5—5 of Figure 1.

Figure 6 is a similar view but showing the tool operated to compress the tire and tube.

Figure 7 is a sectional view approximately on the line 7—7 of Figure 4.

Figure 8 is a sectional view approximately on the line 8—8 of Figure 4.

In the drawings the numeral 1 designates a wheel provided with a drop center rim 2 for the reception of a pneumatic tire 3 that is provided with the usual inner tube 4. In carrying out my invention I provide oppositely disposed pairs of jaw members 5, respectively. The jaws are preferably in the nature of angle irons and each of the jaws is arched longitudinally. There is pivotally secured, as at 6, to the horizontal or outstanding flanges of the jaws 5 the inwardly rounded ends of arms 7, respectively. The oppositely disposed pair of arms are directed toward each other and are either formed with or secured to the ends of tong members 8, respectively. In the showing of the drawings the arms 7 have their ends provided with angularly disposed arched portions which are secured to the sides of the lower and rounded or arched ends of the tongs 8 by bolts or analogous devices. Each pair of tongs 8 comprises two plates which have their central portions arranged in lapping relation and pivotally connected, as at 9. The plates constituting the tong members are rounded or curved in opposite directions from their lapping and pivoted portions. One or both of the bolt members 10 which secure the angle ends of the arms to the lower or inner ends of the tongs is elongated and has arranged thereon a sleeve 11 which contacts with the inner faces of the ends of the respective and oppositely arranged pairs of tongs 8, thus spacing the inner or lower ends of the tongs. Also around the bolt that provides the pivot 9 there is another sleeve 12 which spaced the pairs of tongs at the center thereof. Between the upper or outer ends of the oppositely directed pairs of tongs there are pivotally secured, as at 13, blocks 14 and 15, respectively. The block 14 is in the nature of a nut and has screwed thereto a threaded shank 16. The bore of the block 15 is non-threaded so that the threaded shank 16 passes freely therethrough but there is either screwed or fixed upon the shank 16 to contact with the opposite ends of the block 15 nut members or like stop elements 17, respectively. The outer and non-threaded end of the shank 16 is provided with a crank handle 18. The crank handle is operated to spread the lower arms of the tongs away from each other and consequently bring the jaws 5 away from each other. This permits of the jaws being arranged over the sides of the tire as disclosed by Figure 5 of the drawings. The crank handle 18 is now operated to turn the threaded shank 16 to cause the nut block 14 to travel longitudinally on the shank in the direction of the block 15, thereby operating the tongs to bring the jaws 5 toward each other to cause the said jaws to compress the sides of the tire 3. This brings the tire from frictional engagement with the rim 2 and consequently permits of the ready removal of the tire from the rim. Also when the tool is operated as just described the tire may be readily arranged on the rim. The inner tube 4, when the tire is being positioned on the rim has its lower edge folded inwardly, as disclosed by Figure 6 of the drawings so that no injury will be inflicted to this part of the tire. The tool is to be applied to the portion of the tire where the stem of the tube extends, and it is thought the foregoing will fully set forth the simplicity of my invention, as well as the ease of operation and application thereof so that further detailed description will not be required except to direct attention to the fact that the jaws or shoes 5, 5 are shaped to conform in a general way to the circular curvature of the tire and that they are pivoted to their supports 7, 7 because their upper ends are much closer to the axis of the hinge 9 than are their lower ends, and, if the jaws were rigid with the supports, their lower ends would necessarily travel inwardly much faster than their upper ends during the contracting operation of the appliance. The pivotal mounting of such jaws on their supports therefore permits the device to be used with equal facility and efficiency on tires of materially different cross-sectional dimensions whereby to secure their uniform compression or contraction, regardless of the sizes of their cross-sectional areas within reasonable limits.

Having described the invention, I claim:

1. A tool for applying a tire to a drop center rim comprising tong members pivotally connected together, internally threaded blocks pivoted upon one end of the tong members, a shank threaded through said blocks and having a crank handle, jam nuts screwed upon the shank and adapted to engage opposite ends of the blocks, angle arms attached to the other ends of the tong members and jaw members pivoted upon the angle arms, there being a pair of jaw members at the end of each tong member and the tong members being between the inner ends of the adjacent jaw members and spaced by the angle arms therebetween.

2. In a tire-tool, the combination of a pair of arms hinged together, means to contract and to expand said arms by rocking them on their hinge, supports carried by said arms and jaws shaped to conform to the general curvature of the tire hinged on said supports, said arms being adapted to extend across the tread of a tire and to position said jaws on opposite sides of the tire, whereby upon contracting said arms by swinging them toward one another the jaws will compress the tire between them, each of said jaws having its opposite ends at substantially different distances from the axis of said hinge.

3. In a tire-tool, the combination of a pair of arms hinged together, a nut rockingly mounted on one of said arms, an apertured block rockingly mounted on the other arm, a crank-handle having a shank extended through the aperture of said block and extended through and having screw-threaded connection with said nut, means to prevent the handle shank from sliding in said block, supports on said arms, and jaws conforming to the general curvature of the tire pivoted on said supports, said arms being adapted to extend across the tread of a tire and to position said jaws on opposite sides of the tire, whereby upon contracting said arms by swinging them toward one another upon turning of said handle said jaws will compress the tire between them, each of said jaws having its opposite ends at substantially different distances from the axis of the hinge connection between said arms.

4. In a tire-tool, the combination of a pair of arms in register with one another, a second pair of arms in register with one another, means hinging said first pair of arms to said second pair of arms with the arms of each pair spaced apart, a nut rockingly mounted on and between the arms of one pair, an apertured block rockingly mounted on and between the arms of the other pair, a crank-handle having a shank extended through the aperture of said block and extended through and having screwthreaded connection with said nut, means to prevent said handle shank from sliding in said block, supports mounted on said pairs of arms, and jaws hinged on said supports conforming to the general curvature of the tire, said arms being adapted to extend across the tread of a tire and to position said jaws on opposite sides of the tire, whereby upon contracting said pairs of arms by swinging them on said hinge means upon turning of said handle said jaws will compresss the tire between them, each of said jaws having its opposite ends at substantially different distances from the axis of said hinge means.

In testimony whereof I affix my signature.

BENNIE F. RENN.